United States Patent

Fester

[11] Patent Number: 5,786,806
[45] Date of Patent: Jul. 28, 1998

[54] COLLAPSIBLE KEYBOARD/POINTING STICK STRUCTURE

[75] Inventor: Joseph R. Fester, Tomball, Tex.

[73] Assignee: Compaq Computer Corporation, Houston, Tex.

[21] Appl. No.: 627,697

[22] Filed: Mar. 29, 1996

[51] Int. Cl.$^6$ ............................................. G09G 5/08
[52] U.S. Cl. .......................... 345/161; 345/160; 361/680
[58] Field of Search .................................. 345/156, 160, 345/161, 168, 169, 184; 74/471; 361/680

[56] References Cited

U.S. PATENT DOCUMENTS

| | | | |
|---|---|---|---|
| 5,594,618 | 1/1997 | Sellers | 345/168 |
| 5,621,610 | 4/1997 | Moore et al. | 345/160 |
| 5,635,928 | 6/1997 | Takagi et al. | 345/168 |

*Primary Examiner*—Mark R. Powell
*Assistant Examiner*—Matthew Luu
*Attorney, Agent, or Firm*—Konneker & Smith, P.C.

[57] ABSTRACT

A notebook computer is provided with a collapsible keyboard structure in which, in response to closing of the computer housing lid, a shifting mechanism retracts the keys to a storage/transport orientation in which the overall thickness of the keyboard structure is reduced by an amount essentially equal to the stroke distance of the keys. When the lid is subsequently opened, the shifting mechanism extends the keys outwardly to their extended operating positions. Incorporated into the collapsible keyboard structure is a cursor position control pointing stick device that, via the shifting mechanism, is automatically retracted to a collapsed orientation in response to a corresponding collapsing of the keys, and automatically extended back to a use orientation in response to a corresponding return of the keys to their extended use orientations. Operation of the shifting means rotates the pointing stick in an associated housing in which side projections of the pointing stick are carried in ramped, thread-like grooves within the housing. Rotation of the stick in opposite directions by the shifting means causes the pointing stick to correspondingly move axially in the desired extension and retraction directions thereof.

23 Claims, 4 Drawing Sheets

COLLAPSIBLE KEYBOARD/POINTING STICK STRUCTURE

BACKGROUND OF THE INVENTION

1. Field of the Invention

The present invention relates generally to electronic apparatus, and in a preferred embodiment thereof more particularly relates to keyboard structures for portable computers, such as notebook computers, and associated cursor positioning pointing stick devices.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

A different approach previously proposed to reduce the thickness of a notebook computer keyboard has been to provide the keyboard with the capability of being collapsed, in a direction parallel to that of its keystroke direction, when not in use. Potentially, at least, this approach would appear to have promise since a keystroke distance essentially identical to that in a larger desktop computer keyboard could be maintained when the keyboard was in its extended use orientation, while the thickness of the keyboard in its collapsed storage and transportation orientation is substantially reduced. However, previously proposed collapsible keyboard structures have generally not been entirely satisfactory due to various problems such as complexity, high cost, unreliability and other limitations and disadvantages.

One such additional disadvantage has been the inability to incorporate in a conventional collapsible keyboard structure a "pointing stick" type cursor control device. This device, as typically incorporated in a fixed height keyboard, is basically a stick-shaped member that is positioned generally centrally in the keyboard, in the space between a predetermined group of keys, and longitudinally extends parallel to the keystroke direction with the upper end of the pointing stick being at an elevation at or just slightly above the elevation of the top sides of the keys. User finger pressure exerted in a selected direction on the top end of the pointing stick is transmitted to an underlying pressure sensitive electronic circuit. The circuit responsively outputs an electrical signal which is used in a conventional manner to control the display screen position of a cursor.

Heretofore it has typically not been desirable to incorporate a pointing stick in a collapsible computer keyboard since when the keys are collapsed the upper end of the pointing stick remains at its previous height in which it is now a substantial distance above the elevation of the top sides of the collapsed keys. With the notebook computer lid closed, the outer side of the display screen cannot be brought into close proximity with the top sides of the collapsed keys since the upper end of the pointing stick is in the way. This characteristic of a conventional pointing stick, of course, would eliminate the advantage of the collapsing keyboard. Accordingly, it has heretofore been necessary to use some other type of cursor position control device, such as a mouse, trackball or touch pad, in conjunction with a collapsible keyboard.

As can be readily seen from the foregoing, it would be desirable to provide, in conjunction with a collapsible notebook computer keyboard structure which permits a useful thickness reduction in the closed computer without a corresponding reduction in the operative keystroke distance of the keyboard structure, a pointing stick device that eliminates the above-mentioned disadvantage of a conventional pointing stick used with a collapsible keyboard. It is accordingly an object of the present invention to provide such a collapsible keyboard and associated pointing stick apparatus.

SUMMARY OF THE INVENTION

In carrying out principles of the present invention, in accordance with a preferred embodiment thereof, a portable computer, representatively a notebook computer, is provided with a collapsible keyboard structure incorporating therein a specially designed collapsible pointing stick structure embodying principles of the present invention.

The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion. The lid housing portion has a screen portion upon which a movable cursor may be displayed.

The collapsible keyboard structure representatively includes a key support structure anchored to the base housing and extending across its top side. A series of keys are carried on the top side of the key support structure for vertical movement relative thereto, through a key stroke distance, between upwardly extended operative positions and downwardly retracted nonoperative positions in which the overall vertical thickness of the keyboard structure is reduced by the key stroke distance.

A base structure, representatively a multi-layered signal pad structure, underlies the key support structure and has a portion, representatively a dome sheet, that is carried for horizontal movement relative to the key support structure between a first position in which the dome sheet resiliently holds the keys in their upwardly extended operative positions, and a second position in which the keys are permitted to move to their downwardly retracted nonoperative positions.

Shifting means are provided for shifting the dome sheet from its second position to its first position in response to opening of the lid housing portion, and for shifting the dome sheet from its first position to its second position in response to closing of the lid housing portion.

According to a primary aspect of the invention, the collapsible keyboard structure also comprises a cursor position control system including a manual force-receiving pointing stick device positioned and extending upwardly between a plurality of the keys and being vertically movable, in response to operation of the aforementioned shifting means, between extended and retracted positions when the keys are correspondingly shifted to their extended and retracted positions. This advantageously permits a pointing stick cursor control structure to be incorporated within the perimeter of a collapsible keyboard array without having to forego the height reduction advantages of the collapsible keys since the pointing stick automatically collapses a distance generally equal to or greater than the retraction distance of the keys.

In a preferred embodiment thereof, the collapsible pointing stick device includes a manual force-receiving pointing stick member longitudinally extending along an axis parallel to the key stroke direction and being positioned and extending outwardly between a plurality of the keys. Support means are provided and are operative to support the pointing stick for rotation in opposite directions relative to the keyboard structure about the pointing stick axis in a manner causing the pointing stick to be moved axially in opposite directions between extended use and retracted storage/transport orientations thereof. A translatable member is connected to the support means and is translatable in opposite directions relative thereto in a manner selectively rotating the pointing stick in opposite directions about its axis.

Shifting means are preferably provided and are operative to (1) shift the keys to their extended use positions while moving the translatable member in a first direction to cause the pointing stick to axially move to its extended use orientation, and (2) shift the keys to their retracted storage/transport positions while moving the translatable member in a second direction to cause the pointing stick to axially move to its retracted storage/transport orientation. Representatively, the support means are secured to the underside of the signal pad structure, the shifting means are operable to shift the dome sheet portion relative to the balance of the keyboard structure, and the translatable member linked to the dome sheet for conjoint shifting movement therewith.

The support means preferably include a pressure sensitive printed circuit board operatively connected on a first side thereof to an end of the pointing stick; a generally disc-shaped support plate to a side of which the second side of the printed circuit board is anchored, the support plate having a series of radially outwardly projecting mounting post portions spaced around its circumference; and a housing having a generally circularly cross-sectioned opening therein with a side surface in which a circumferentially spaced plurality of axially ramped grooves are formed, the opening coaxially and rotatably receiving the support plate with the grooves slidably receiving the outwardly projecting mounting post portions.

The housing has a slot formed therein, the slot generally extending tangentially into the circularly cross-sectioned housing opening. The translatable member has an elongated configuration with a first end portion thereof extending into the slot and having an opening through which one of said mounting post portions slidably extends. The axially ramped grooves in the interior housing side surface preferably have ends with generally axially facing ledges disposed thereon and upon which the mounting post portions may rest and be supported by when the pointing stick is in its extended use orientation.

DETAILED DESCRIPTION

Figure 1:
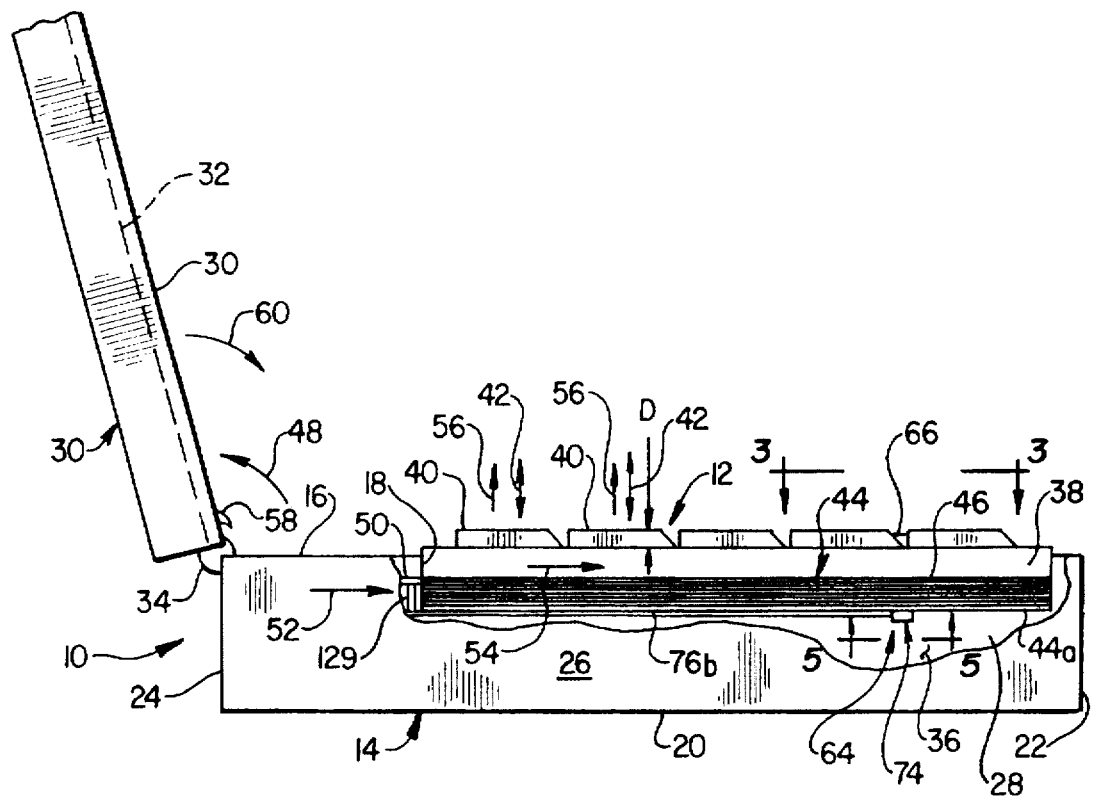
FIG. 1 is a partially sectioned, simplified side elevational view of a notebook computer having a collapsible keyboard structure, and an associated collapsible cursor positioning pointing stick, embodying principles of the present invention, the computer being in an opened orientation and the keyboard structure being in its key-extended use configuration.
Figure 2:
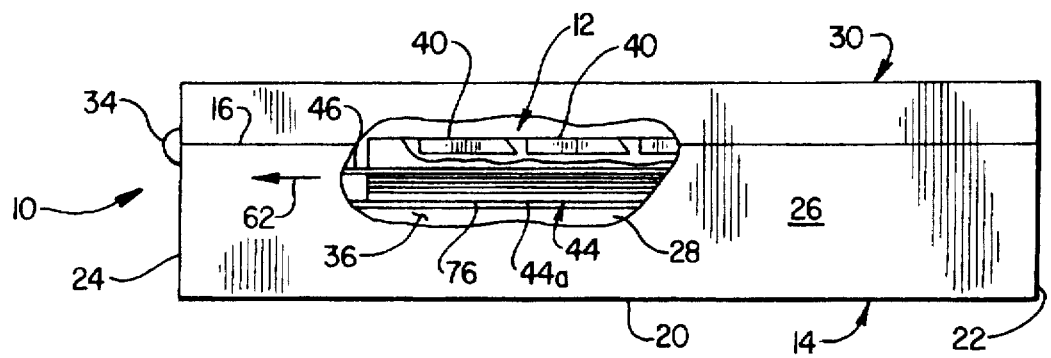
FIG. 2 is a view similar to that in FIG. 1, but with the computer in its closed orientation and the keyboard structure being in its key-retracted storage/transport orientation in which the pointing stick is also retracted.
Figure 3:
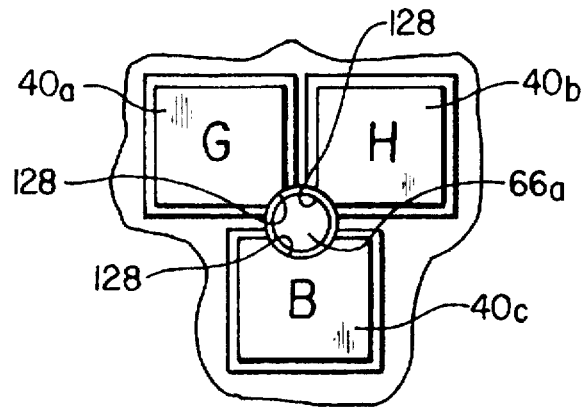
FIG. 3 is an enlarged scale top plan view of a portion of the keyboard structure, including an upper end of the associated collapsible pointing stick structure, taken generally along line 3—3 of FIG. 1.
Figure 4:
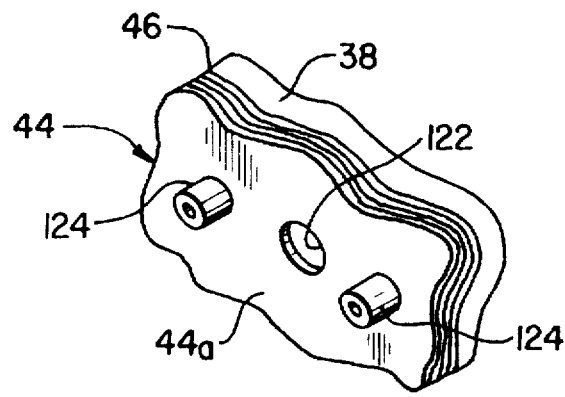
FIG. 4 is an enlarged scale bottom side perspective view of a portion of multi-layer signal pad section of the keyboard to which the collapsible pointing stick structure is connected.

Referring initially to FIGS. 1 and 2, the present invention provides an electronic device, illustratively a portable notebook computer 10, having a collapsible keyboard structure 12. With the exception of a subsequently described collapsible stick device incorporated therein and embodying principles of the present invention, the collapsible keyboard structure is similar to that illustrated and described in copending U.S. patent application Ser. No. 08/610,216 (Attorney Docket No. CMPQ-0627CIP), filed on Mar. 4, 1996 and hereby incorporated in its entirety herein by reference.

Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Via conventional electronic control circuitry (not shown), a movable cursor (also not shown) may be displayed on the screen 32. Lid housing 30 may upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. With continuing reference to FIGS. 1 and 2, the keyboard structure basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the double ended arrows 42 in FIG. 1) through a keystroke distance D; and a rectangularly configured, multilayer signal pad structure 44 that underlies the support structure 38 and is transverse to the keystroke directions 42.

The top layer of the signal pad structure 44 is defined by a conventional plastic dome sheet 46 that is horizontally shiftable in forward and rearward directions (i.e., left and right as viewed in FIGS. 1 and 2) relative to the balance of the signal pad structure 46 and the monoblock support structure 38. As illustrated and described in copending U.S. patent application Ser. No. 08/610,216 incorporated by reference herein, when the computer lid housing 30 is opened as indicated by the arrow 48 in FIG. 1 spring means (not shown) in the base housing 14 forwardly move a bar actuator 50 (see FIG. 1) within the base housing 14 as indicated by the arrow 52 in FIG. 1.

Bar actuator 50 is suitably anchored to a rear side edge portion of the dome sheet 46. Accordingly, when the bar actuator 50 is forwardly driven in response to opening of the computer lid housing 30, the dome sheet 46 is also forwardly (i.e., rightwardly) driven away from its leftwardly shifted position shown in FIG. 2, as indicated by the arrow 54 in FIG. 1. In a manner described in the aforementioned copending U.S. application Ser. No. 08/610,216 incorporated herein by reference, the forward shifting of the dome sheet 46 upwardly drives the keys 40 to their FIG. 1 extended use positions, as indicated by the arrows 56 in FIG. 1, from their downwardly retracted storage/transport positions shown in FIG. 2.

Hook-like projections 58 (see FIG. 1) are formed on the inner side 30a of the lid housing 30 near the hinge joint 34. When the lid housing 30 is closed, as indicated by the arrow 60 in FIG. 1, the projections 58 engage the bar actuator 50 and drive it rearwardly (i.e., leftwardly as viewed in FIG. 2). This, in turn, rearwardly shifts the dome sheet 46 as indicated by the arrow 62 in FIG. 2. In a manner illustrated and described in the aforementioned copending U.S. application Ser. No. 08/610,216 incorporated herein by reference, the leftward shifting of the dome sheet 46 drives the keys 40 downwardly, through the keystroke distance D, to their FIG. 2 retracted storage/transport orientations.

Figure 6:
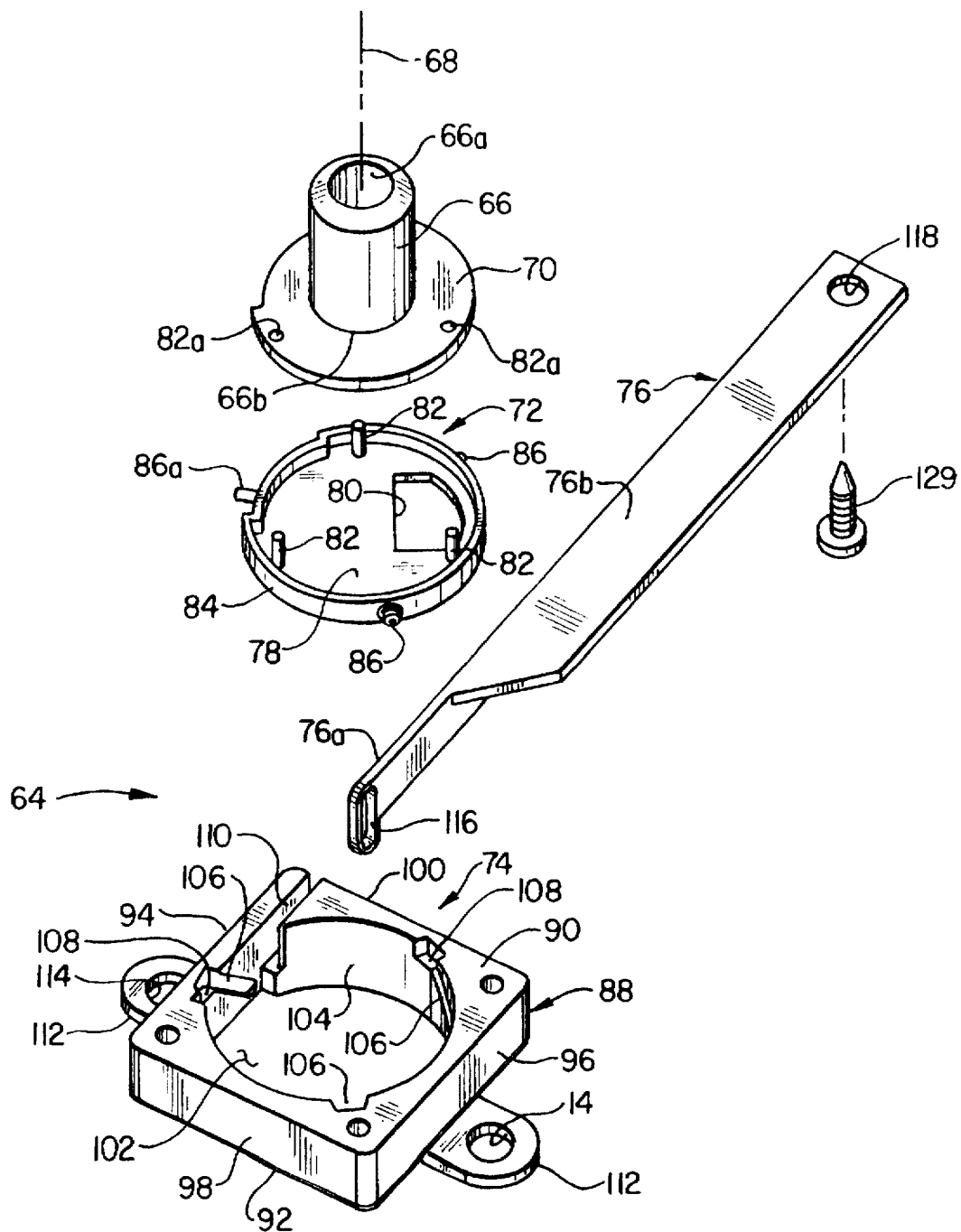
FIG. 6 is an enlarged scale exploded perspective view of the collapsible pointing stick structure.

According to a primary aspect of the present invention, a specially designed collapsible pointing stick device 64 is incorporated into the collapsible keyboard structure 12. Referring now to FIGS. 6–7B, the collapsible pointing stick device 64 includes a cylindrical pointing stick 66 longitudinally extending along an axis 68 and having an upper end 66a; a generally disc-shaped pressure sensitive printed circuit board 70 centrally secured along the top side thereof to the bottom end 66b of the pointing stick 66; a plastic support plate member 72; a molded plastic housing member 74; and an elongated translatable metal bar member 76.

Support plate 72 has a generally disc-shaped base wall 78 with a connection opening 80 formed therein, and three upwardly projecting attachment studs 82 spaced around its periphery. A retaining wall 84 projects upwardly from the periphery of the base wall 78 and has a circumferentially spaced plurality of mounting post members 86 projecting radially outwardly therefrom. The pressure sensitive printed circuit board 70 is complementarily received downwardly within the retaining wall 84 and is anchored to the top side of the base wall 78 by passing the plastic attachment studs 82 upwardly through corresponding holes 82a in the printed circuit board 70 and then heat staking the upper ends 82b of the studs 82 to expand them over the top side of the printed circuit board 70 as illustrated in FIGS. 7A and 7B.

Housing member 74 has a rectangular body portion 88 with top and bottom sides 90 and 92, opposite left and right vertical sides 94 and 96, and opposite front and rear vertical sides 98 and 100. A generally circular opening 102 extends through the body portion 88, between its top and bottom sides 90 and 92, and has an interior side surface 104 in which a plurality of circumferentially spaced grooves 106 are formed. Each to the grooves 106 is axially ramped in a manner such that it spirals in an upward and counterclockwise direction as viewed in FIGS. 6, 7A and 7B, and has an upper end with an upwardly facing horizontal ledge 108 therein.

A slot 110 is formed on the top side 90 of the body portion 88, adjacent the left side 94 thereof, and extends generally tangentially into the opening 102. For purposes later described, a pair of bottom side mounting tabs 112, with circular holes 114 in their outer ends, project outwardly from the opposite left and right sides 94 and 96 of the body portion 88. The translatable bar member 76 has an inner end portion 76a with a connection opening 116 therein, and a widened body portion 76b which is transverse to the inner end portion 76b and has a circular opening 118 in its outer end.

Figure 7A:
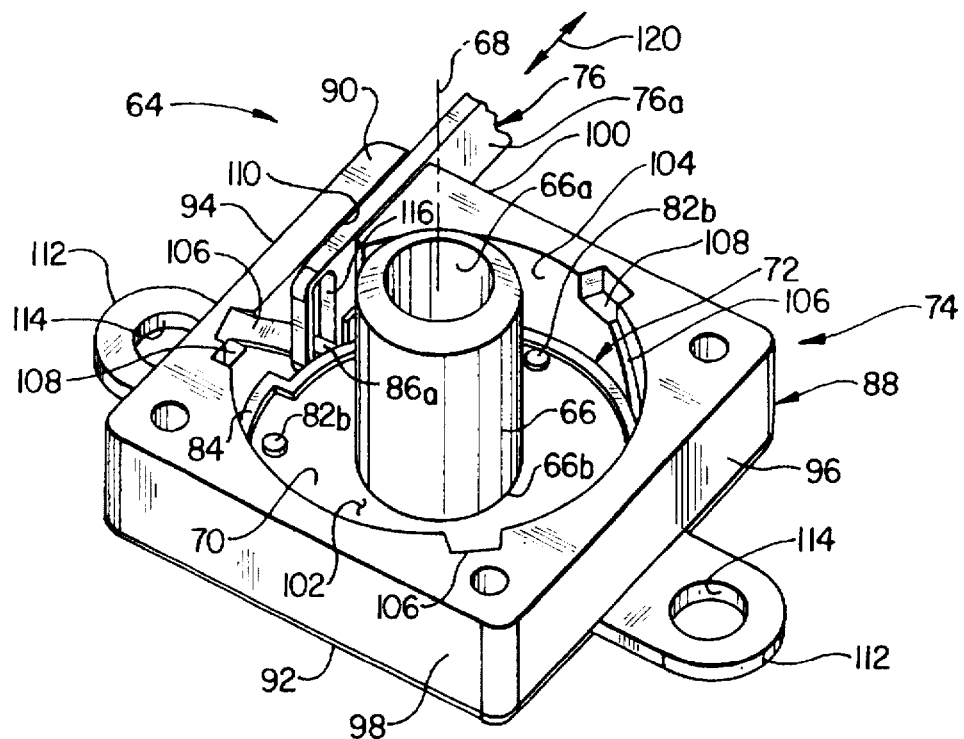
FIGS. 7A and 7B, respectively, are enlarged scale perspective views of the assembled collapsible pointing stick structure in lowered and raised orientations thereof.
Figure 7B:
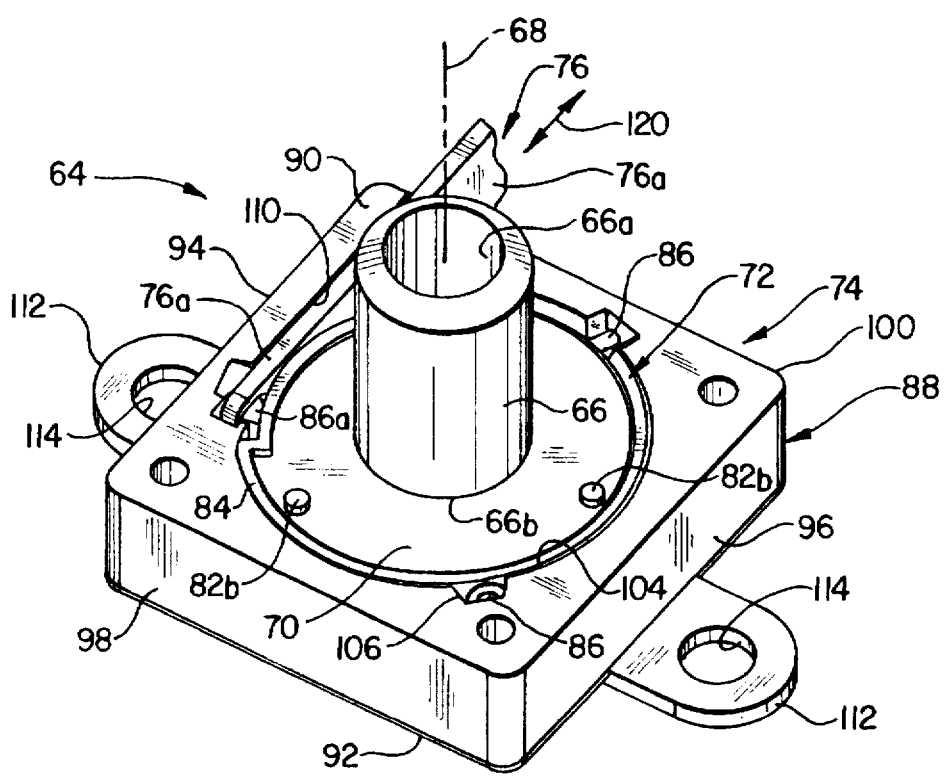

Referring now to FIGS. 7A and 7B, the support plate 72 is coaxially and rotatably received in the housing body portion opening 102, with the support plate mounting posts 86 being slidably received in the axially ramped side surface grooves 106 in the housing body portion 88. The translatable bar member inner end portion 76a is slidably received in the body slot 110 as illustrated and receives one of the mounting posts 86a in its inner end opening 116. Bar 76 is longitudinally translatable forwardly and rearwardly relative to the housing 74, as indicated by the double ended arrows 120 in FIGS. 7A and 7B, to respectively cause the pointing stick 66 to rotate in counterclockwise and clockwise directions about its axis 68 relative to the housing 74 via the sliding interaction between the mounting posts 86 and the axially ramped grooves 86 that receive them.

A counterclockwise rotation of the pointing stick 66 relative to the housing 74 raises the pointing stick 66 to an upwardly extended use orientation as shown in FIG. 7B. In this vertically raised orientation of the pointing stick 66 the posts 86 rest on the upper groove end ledges 108 to prevent the pointing stick to be downwardly translated. A clockwise rotation of the pointing stick 66 (from its raised FIG. 7B orientation) lowers the pointing stick relative to the housing 74 to a downwardly retracted storage/transport orientation of the pointing stick shown in FIG. 7A.

Figure 5:
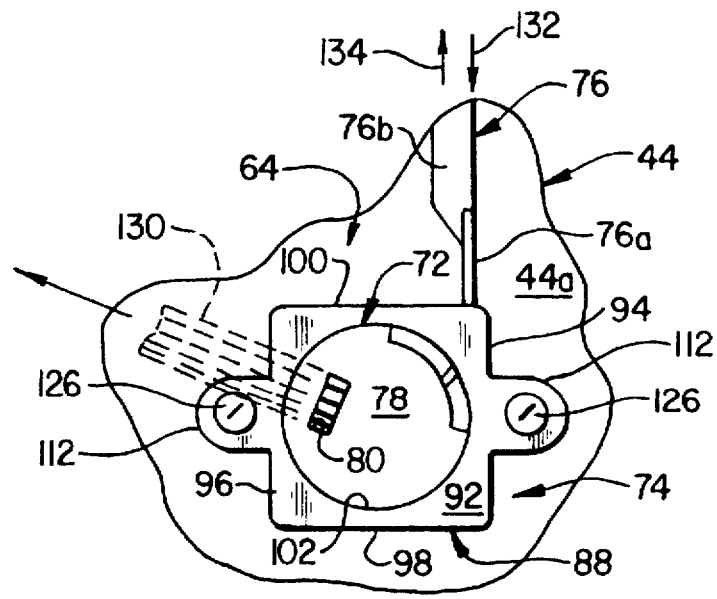
FIG. 5 is an enlarged scale bottom plan view of a portion of the multi-layer signal pad section with the collapsible pointing stick structure operatively connected thereto.

Turning now to FIGS. 1–5, the bottom side 44a of the signal pad structure 44 has a circular opening 122 (see FIG. 4) extending upwardly therethrough to the top side of the monoblock support structure 38, the opening 122 being disposed between a spaced apart pair of downwardly projecting cylindrical mounting bosses 124. As shown in FIG. 5, the housing body 88 is mounted top side 90 up on the bottom side 44a of the signal pad structure 44 (see also FIG. 1) by inserting the bosses 124 downwardly through the mounting tab holes 114 and then threading attachment screws 126 upwardly into the bosses 124.

The translatable bar member 76 longitudinally extends rearwardly away from the mounted housing body 88, and the pointing stick 66 is aligned with the signal pad structure hole 122 and an upward extension thereof defined by arcuate corner cutouts 128 formed in three adjacent keys 40a,40b and 40c (see FIG. 3), representatively the "G", "H" and "B" keys. With the pointing stick 66 in its upwardly extended use orientation its upper end 66a is just slightly above the top sides of the keys 40a in their corresponding upwardly extended use positions. With the pointing stick 66 in its downwardly retracted storage/transport orientation, the top end 66a of the pointing stick 66 is generally level with the top sides of the downwardly retracted keys 40. The outer end of the bar member body portion 76b (see FIGS. 1 and 6) is connected to the bar actuator 50 by a screw 129 extended upwardly through the translatable bar member outer end hole 118 and threaded into the overlying bar actuator 50.

For purposes later described, the pointing stick device 64 also includes a flexible ribbon type connector cable 130 (shown in phantom in FIG. 5) having one end portion thereof extending upwardly through the support disc opening 80 (see FIG. 6) and operatively coupled to the circuitry in the pressure sensitive printed circuit board 70 against which the lower end 66b of the pointing stick operatively bears.

With the computer lid housing opened (see FIG. 1), the translatable bar member 76 is forwardly shifted, as indicated by the arrow 132 in FIG. 5, to thereby rotate the pointing stick 66 as previously described in a manner raising it to its upwardly extended use orientation as the keys 40 are being raised to their upwardly extended use positions by the forward shifting of the dome sheet 46. A subsequent closing of the computer lid housing 30 (see FIG. 2) rearwardly shifts the translatable bar member 76, as indicated by the arrow 134 in FIG. 5, to thereby rotate the pointing stick 66 in the opposite direction in a manner lowering it to its downwardly retracted storage/transport orientation as the keys 40 are being lowered to their downwardly retracted storage/transport positions by the rearward shifting of the dome sheet 46.

The foregoing detailed description is to be clearly understood as being given by way of illustration and example only, the spirit and scope of the present invention being limited solely by the appended claims.

What is claimed is:

1. A keyboard structure for an electronic device having a screen upon which a movable cursor may be displayed, said keyboard structure comprising:

a keyboard support structure;

a mutually spaced series of keys each carried on said keyboard support structure for movement relative thereto, in a first direction, between extended use and retracted storage/transport positions;

cursor positioning means operative to generate a signal useable to selectively vary the screen position of the cursor, said cursor positioning means including:

a manual force-receiving pointing stick longitudinally extending along an axis parallel to said first direction, said pointing stick being positioned and extending outwardly between a plurality of said keys, support means for supporting said pointing stick for rotation in opposite directions relative to said keyboard support structure about said axis in a manner causing said pointing stick to be moved axially in opposite directions between extended use and retracted storage/transport orientations thereof, and a translatable member connected to said support means and being translatable in opposite directions relative thereto in a manner selectively rotating said pointing stick in said opposite directions about said axis.

2. The keyboard structure of claim 1 wherein said keyboard structure is a computer keyboard structure.

3. The keyboard structure of claim 2 wherein said computer keyboard structure is a portable computer keyboard structure.

4. The keyboard structure of claim 3 wherein said portable computer keyboard structure is a notebook computer keyboard structure.

5. The keyboard structure of claim 1 further comprising:

shifting means operative to (1) shift said keys to said extended use positions thereof while moving said translatable member in a first direction to cause said pointing stick to axially move to said extended use orientation thereof, and (2) shift said keys to said retracted storage/transport positions thereof while moving said translatable member in a second direction to cause said pointing stick to axially move to said retracted storage/transport orientation thereof.

6. The keyboard structure of claim 5 wherein:

said keyboard structure further comprises a multi-layer signal pad structure underlying said keyboard support structure and having a dome sheet portion shiftable relative to the balance of said multi-layer signal pad structure, said keyboard support structure, and said support means, in a second direction transverse to said first direction, said shifting means are operable to shift said dome sheet portion in said second direction, and said translatable member is supported for conjoint movement with said dome sheet portion in said second direction.

7. The keyboard structure of claim 6 wherein:

said support means are carried on the underside of said signal pad structure, said shifting means include a shifting bar member anchored to an edge portion of said dome sheet portion, and said translatable member has an elongated configuration, a first end anchored to said shifting bar member, and a second end operatively linked to said support means.

8. The keyboard structure of claim 1 wherein said support means include:

a pressure sensitive printed circuit board operatively connected on a first side thereof to an end of said pointing stick, a generally disc-shaped support plate to a side of which the second side of said printed circuit board is anchored, said support plate having a circumferentially spaced plurality of radially outwardly projecting mounting post portions, and a housing having a generally circularly cross-sectioned opening therein with a side surface in which a circumferentially spaced plurality of axially ramped grooves are formed, said opening coaxially and rotatably receiving said support plate with said grooves slidably receiving said mounting post portions.

9. The keyboard structure of claim 8 wherein:

said housing has a slot formed therein and generally tangentially extending into said generally circularly cross-sectioned opening, and said translatable member has an elongated configuration with a first end portion thereof extending into said slot and having an opening through which one of said mounting post portions slidably extends.

10. The keyboard structure of claim 8 wherein:

said axially ramped grooves have ends with generally axially facing ledges disposed thereon and upon which said mounting post portions may rest and be supported by when said pointing stick is in said extended use orientation thereof.

11. Collapsible pointing stick apparatus for use in selectively repositioning a display screen cursor on an electronic device, said collapsible pointing stick apparatus comprising:

a manual force-receiving pointing stick longitudinally extending along an axis;

support means for supporting said pointing stick for rotation in opposite directions relative thereto about said axis in a manner causing said pointing stick to be moved axially in opposite directions relative to said support means between extended use and retracted storage/transport orientations of said pointing stick; and a translatable member connected to said support means and being translatable relative thereto in opposite directions transverse to said axis in a manner selectively rotating said pointing stick in said opposite directions about said axis.

12. The collapsible pointing stick apparatus of claim 11 wherein said support means include:

a pressure sensitive printed circuit board operatively connected on a first side thereof to an end of said pointing stick, a generally disc-shaped support plate having a side to which the second side of said printed circuit board is anchored, said support plate having a circumferentially spaced plurality of radially outwardly projecting mounting post portions, and a housing having a generally circularly cross-sectioned opening therein with a side surface in which a circumferentially spaced plurality of axially ramped grooves are formed, said support plate being coaxially and rotatably received in said opening with said grooves slidably receiving said mounting post portions.

13. The collapsible pointing stick apparatus of claim 12 wherein:

said housing has a slot formed therein and generally tangentially extending into said opening, and said translatable member has an elongated configuration with a first end portion thereof extending into said slot and having an opening through which one of said mounting post portion slidably extends.

14. The collapsible pointing stick apparatus of claim 12 wherein:

said axially ramped grooves have ends with generally axially facing ledges disposed thereon and upon which said mounting post portions may rest and be supported by when said pointing stick is in said extended use orientation thereof.

15. The collapsible pointing stick apparatus of claim 12 wherein:

said support plate has an opening therein which underlies said printed circuit board, and said collapsible pointing stick apparatus further comprises a ribbon cable member having an end portion extending through said support plate opening and being operatively coupled to said printed circuit board.

16. An electronic device comprising:

a base portion having a top side;

a lid housing portion secured to said base housing portion for pivotal movement relative thereto between a closed position in which said lid housing portion extends across and covers said top side, and an open position in which said lid housing portion uncovers and exposes said top side, said lid housing portion having a screen thereon on which a movable cursor may be displayed; and a collapsible keyboard structure extending along said top side of said base portion and including:

a key support structure, a series of keys each carried on said key support structure for vertical movement relative thereto, in a key stroke direction, between extended and retracted positions, cursor positioning means operative to generate a signal useable to selectively vary the screen position of the cursor, said cursor positioning means including:

a manual force-receiving pointing stick longitudinally extending along an axis parallel to said first direction, said pointing stick being positioned and extending upwardly between a plurality of said keys, support means for supporting said pointing stick for rotation in opposite directions relative to said keyboard support structure about said axis in a manner causing said pointing stick to be moved axially in opposite directions between extended use and retracted storage/transport positions thereof, and a translatable member connected to said support means and being translatable in opposite directions relative thereto, transversely to said first direction, in a manner selectively rotating said pointing stick in said opposite directions about said axis, and shifting means operative in response to movement of said lid housing portion to said closed position thereof to drive said keys and, via said translatable member, said pointing stick to said retracted positions thereof, and operative in response to movement of said lid housing portion to said open position thereof to drive said keys and, via said translatable member, said pointing stick to said extended positions thereof.

17. The electronic device of claim 16 wherein:

said electronic device further comprises a multi-layer signal pad structure underlying said keyboard support structure and having a dome sheet portion shiftable relative to the balance of said multi-layer signal pad structure, said keyboard support structure, and said support means, in a second direction transverse to said first direction, said shifting means are operable to shift said dome sheet portion in said second direction, and said translatable member is supported for conjoint movement with said dome sheet portion in said second direction.

18. The electronic device of claim 17 wherein:

said support means are carried on the underside of said signal pad structure, said shifting means include a shifting bar member anchored to an edge portion of said dome sheet portion, and said translatable member has an elongated configuration, a first end anchored to said shifting bar member, and a second end operatively linked to said support means.

19. The electronic device of claim 16 wherein said support means further include:

a pressure sensitive printed circuit board operatively connected on a first side thereof to an end of said pointing stick, a generally disc-shaped support plate, the second side of said printed circuit board being anchored to a side of said support plate, said support plate having a circumferentially spaced plurality of radially outwardly projecting mounting post portions, and a housing having a generally circularly cross-sectioned opening therein with a side surface in which a circumferentially spaced plurality of axially ramped grooves are formed, said support plate being coaxially and rotatably received in said opening with said mounting post portions being slidably received in said grooves.

20. The electronic device of claim 19 wherein:

said housing has a slot formed therein and generally tangentially extending into said opening, said translatable member has an elongated configuration with a first end portion thereof extending into said slot and having an opening through which one of said mounting post portions slidably extends.

21. The electronic device of claim 19 wherein:

said axially ramped grooves have ends with generally axially facing ledges disposed thereon and upon which said mounting post portions may rest and be supported by when said pointing stick is in said extended use position thereof.

22. The electronic device of claim 16 wherein said electronic device is a portable computer.

23. The electronic device of claim 22 wherein said portable computer is a notebook computer.

* * * * *